United States Patent
Guy

(10) Patent No.: US 10,105,771 B2
(45) Date of Patent: Oct. 23, 2018

(54) ROTARY CUTTING TOOL HAVING TOOL HOLDER WITH CONICAL INTERNAL THREAD AND REPLACEABLE CUTTING HEAD WITH STRAIGHT EXTERNAL THREAD, AND SAID TOOL HOLDER

(71) Applicant: Iscar, Ltd., Tefen (IL)

(72) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 221 days.

(21) Appl. No.: 15/075,782

(22) Filed: Mar. 21, 2016

(65) Prior Publication Data
US 2017/0266738 A1    Sep. 21, 2017

(51) Int. Cl.
B23C 5/10   (2006.01)
B23B 31/11  (2006.01)
B23C 5/22   (2006.01)

(52) U.S. Cl.
CPC ............ *B23C 5/10* (2013.01); *B23B 31/1115* (2013.01); *B23B 31/1122* (2013.01); *B23C 5/109* (2013.01); *B23C 5/22* (2013.01); *B23C 2210/02* (2013.01); *B23C 2210/03* (2013.01); *B23C 2240/32* (2013.01); *B23C 2265/08* (2013.01)

(58) Field of Classification Search
CPC ....... Y10T 408/9098; Y10T 408/90993; Y10T 408/94; Y10T 408/95; Y10T 408/957; Y10T 407/1946; Y10T 407/1948; Y10T 409/30952; Y10T 279/16; B23B 31/11; B23B 31/1107; B23B 31/1115; B23B 31/1122; B23C 2210/03; B23C 2210/02; F16B 33/02; F16B 39/30

USPC .............................. 411/307–309, 366.1, 423
See application file for complete search history.

(56) References Cited

U.S. PATENT DOCUMENTS

| | | | | |
|---|---|---|---|---|
| 3,762,745 A | * | 10/1973 | Cunningham | E21B 17/042 285/330 |
| 6,485,220 B2 | | 11/2002 | Hecht | |
| 7,611,311 B2 | | 11/2009 | Kakai et al. | |
| 7,713,004 B2 | | 5/2010 | Lehto et al. | |
| 8,696,281 B2 | * | 4/2014 | Tomm | F16L 15/006 411/308 |
| 2006/0072977 A1 | * | 4/2006 | Jonsson | B23B 31/1107 408/233 |
| 2007/0116539 A1 | | 5/2007 | Malik et al. | |
| 2007/0248421 A1 | * | 10/2007 | Kakai | B23B 31/1107 407/34 |
| 2014/0056658 A1 | * | 2/2014 | Maeda | B23C 5/109 407/40 |
| 2014/0321928 A1 | | 10/2014 | Guy et al. | |

(Continued)

FOREIGN PATENT DOCUMENTS

JP          2011056594 A  *  3/2011

*Primary Examiner* — Nicole N Ramos
(74) *Attorney, Agent, or Firm* — Womble Bond Dickinson (US) LLP

(57) ABSTRACT

A rotary cutting tool includes a replaceable cutting head and a tool holder. The replaceable cutting head includes a forward cutting portion and a rearward mounting portion. The mounting portion includes a male coupling member that includes a straight external thread. The tool holder includes a female coupling member that includes a conical internal thread. When the rotary cutting tool is in a locked position, the external thread is threadingly engaged with the internal thread.

20 Claims, 5 Drawing Sheets

(56) References Cited

U.S. PATENT DOCUMENTS

| | | | |
|---|---|---|---|
| 2015/0030399 A1* | 1/2015 | Frota de Souza | B23C 5/10 407/33 |
| 2015/0202690 A1* | 7/2015 | Haimer | B23B 31/1115 279/99 |
| 2015/0217380 A1* | 8/2015 | Haimer | B23B 31/005 279/99 |

* cited by examiner

ROTARY CUTTING TOOL HAVING TOOL HOLDER WITH CONICAL INTERNAL THREAD AND REPLACEABLE CUTTING HEAD WITH STRAIGHT EXTERNAL THREAD, AND SAID TOOL HOLDER

FIELD OF THE INVENTION

The subject matter of the present application relates to rotary cutting tools of the type in which a replaceable cutting head, having a male coupling member, is removably retained in a female coupling member, of a tool holder, by means of a threaded coupling mechanism.

BACKGROUND OF THE INVENTION

Rotary cutting tools can be provided with a threaded coupling mechanism, or "tool joint", for securely retaining a replaceable cutting head within a tool holder.

The replaceable cutting head can include a male coupling member and the tool holder can include a female coupling member. The male coupling member can include an external thread. The female coupling member can include an internal thread that corresponds to the external thread on the male coupling member.

In some such rotary cutting tools, the internal and external threads are both straight threads. An example of such a rotary cutting tool is disclosed in, for example, U.S. Pat. No. 6,485,220.

In other such rotary cutting tools, the internal and external threads are both tapered threads. Examples of such a rotary cutting tool are disclosed in, for example, U.S. Pat. Nos. 7,611,311 and 7,713,004.

SUMMARY OF THE INVENTION

In accordance with a first aspect of the subject matter of the present application there is provided a rotary cutting tool having a longitudinal axis and extending in a forward to rearward direction, comprising:
 a tool holder, having a holder longitudinal axis and comprising a female coupling member having an internal thread extending rearwardly from a holder forward surface, the holder forward surface extending transversely with respect to the holder longitudinal axis; and
 a replaceable cutting head having a head longitudinal axis and comprising:
  a forward portion forming a cutting portion; and
  a rearward portion forming a mounting portion, the mounting portion comprising a male coupling member having an external thread and protruding rearwardly from a head base surface, the head base surface extending transversely with respect to the head longitudinal axis, and defining a boundary between the cutting portion and the mounting portion;
 wherein:
 the external thread of the male coupling member is a straight thread;
 the internal thread of the female coupling member is conical thread; and
 the rotary cutting tool is adjustable between:
  a released position in which the male coupling member is located outside of the female coupling member, and the internal and external threads are not threadingly engaged to one another, and
  a locked position in which the male coupling member is removably retained in the female coupling member with the internal and external threads threadingly engaged to one another.

In accordance with another aspect of the subject matter of the present application there is provided a tool holder, having a holder longitudinal axis extending in the forward to rearward direction, comprising a female coupling member having an internal thread extending rearwardly from a holder forward surface, the holder forward surface extending transversely with respect to the holder longitudinal axis, wherein:
 the internal thread of the female coupling member is a conical thread;
 the internal thread comprises an internal thread ridge extending helically about an internal thread axis and comprising forward and rearward internal flank surfaces; and an internal top surface extending therebetween;
 the forward and rearward internal flank surfaces generally face in opposite axial directions and delimit a helical internal thread groove that comprises an internal bottom surface;
 at least one of the internal thread ridge and the internal thread groove extend about a respective cone having a cone angle; and
 the cone angle is in the range of $0.02° \leq \gamma \leq 1.6°$.

In accordance with yet another aspect of the subject matter of the present application there is provided a rotary cutting tool having a longitudinal axis and extending in a forward to rearward direction, comprising:
 a replaceable cutting head having a head longitudinal axis and comprising:
  a forward portion forming a cutting portion; and
  a rearward portion forming a mounting portion, the mounting portion comprising a male coupling member having an external thread and protruding rearwardly from a head base surface, the head base surface extending transversely with respect to the head longitudinal axis, and defining a boundary between the cutting portion and the mounting portion;
 wherein:
 the external thread of the male coupling member is a straight thread; and
 the rotary cutting tool is adjustable between:
  a released position in which the male coupling member is located outside of the female coupling member, and the internal and external threads are not threadingly engaged to one another, and
  a locked position in which the male coupling member is removably retained in the female coupling member with the internal and external threads threadingly engaged to one another It is understood that the above-said is a summary, and that features described hereinafter may be applicable in any combination to the subject matter of the present application, for example, any of the following features may be applicable to the rotary cutting too and/or the tool holder:

The internal thread comprises an internal thread ridge, extending helically about an internal thread axis, and comprising forward and rearward internal flank surfaces and an internal top surface extending therebetween, the forward and rearward internal flank surfaces generally face in opposite axial directions and delimit a helical internal thread groove that comprises an internal bottom surface; and
 in the released position:
  at least one of the internal thread ridge and the internal thread groove extend about a respective cone having a cone angle; and the cone angle can be in the range of $0.02° \leq \gamma \leq 1.6°$.

The cone angle can be equal to exactly 0.8°.

Only the internal thread groove can extend about a respective cone.

In a cross-sectional view taken in an axial plane containing the internal thread axis, the internal top surface forms a plurality of internal thread crests that can be parallel to the internal thread axis and co-linear with each other and the internal bottom surface forms a plurality of internal thread roots are parallel to the internal thread axis and follow a pattern of decreasing distance therefrom in the rearward direction.

The forward and rearward internal flank surfaces are offset from the internal thread axis by a distance that can decrease as the internal ridge extends helically about the internal thread axis in the rearward direction.

The external thread comprises an external thread ridge, extending helically about an external thread axis, and comprising forward and rearward external flank surfaces and an external top surface extending therebetween, the forward and rearward external flank surfaces generally face in opposite axial directions and delimit a helical external thread groove that comprises an external bottom surface;

the forward external flank surface and the forward internal flank surface face in the forward direction and the rearward external flank surface and the rearward internal flank surface face in the rearward direction; and in the locked position:

the rearward internal flank surface can abut the forward external flank surface.

In the locked position the forward internal flank surface can be spaced apart from the rearward external flank surface. The internal top surface can be spaced apart from the external bottom surface. The internal bottom surface can be spaced apart from the external top surface.

In a cross-sectional view taken in an axial plane containing the external thread axis, the external top surface forms a plurality of external thread crests that can be parallel to the external thread axis and co-linear with each other and the external bottom surface forms a plurality of external thread roots that are parallel to the external thread axis and co-linear with each other.

In a cross-sectional view taken in an axial plane containing the head longitudinal axis, the external thread defines an external thread form that can be trapezoidal.

In a cross-sectional view taken in an axial plane containing the holder longitudinal axis, the internal thread defines an internal thread form that can be trapezoidal.

The external thread comprises an external thread ridge, extending helically about an external thread axis, and comprising forward and rearward external flank surfaces and an external top surface extending therebetween;

the forward and rearward external flank surfaces generally face in opposite axial directions and delimit a helical external thread groove that comprises an external bottom surface;

the forward external flank surface and the forward internal flank surface face in the forward direction;

the rearward external flank surface and the rearward internal flank surface face in the rearward direction;

in the locked position:

the rearward internal flank surface can abut the forward external flank surface;

the forward internal flank surface can be spaced apart from the rearward external flank surface;

the internal top surface can be spaced apart from the external bottom surface; and the internal bottom surface can be spaced apart from the external top surface; and frictional engagement between the external thread and the internal thread can increase in a direction from a forwardmost turn of the external thread towards the rearmost turn of the external thread.

BRIEF DESCRIPTION OF THE FIGURES

For a better understanding of the present application and to show how the same may be carried out in practice, reference will now be made to the accompanying drawings, in which.

Figure 1:
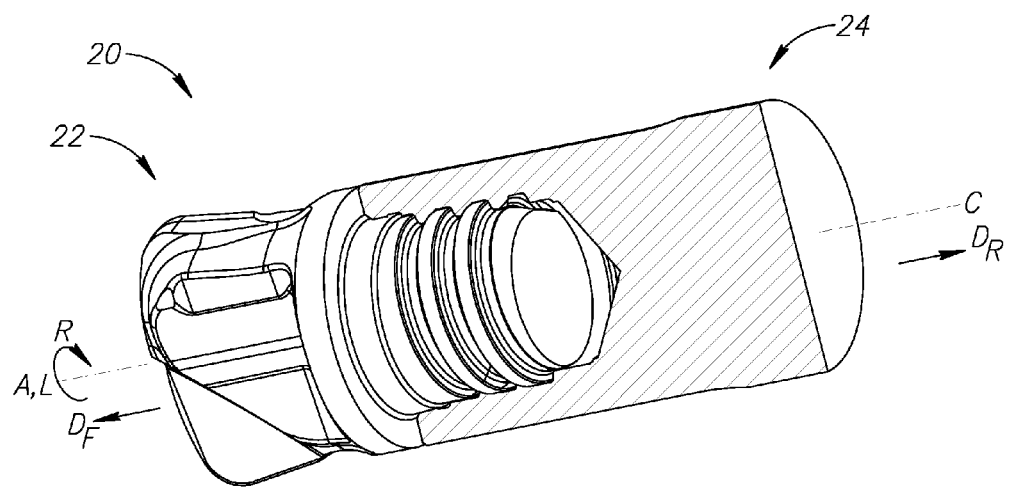
FIG. 1 is a perspective longitudinal cross-sectional view of a rotary cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
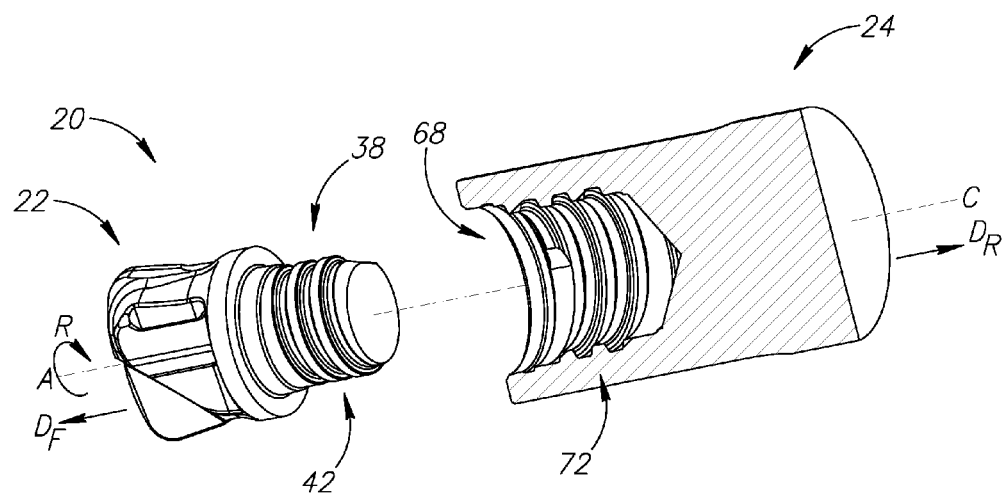
FIG. 2 is an exploded perspective longitudinal cross-sectional view of the rotary cutting tool shown in FIG. 1.

Attention is first drawn to FIGS. 1 and 2 showing a rotary cutting tool 20 of the type used for milling operations, specifically fast face milling, in accordance with embodiments of the subject matter of the present application. The rotary cutting tool 20 has a tool longitudinal axis L around which the tool rotates in a direction of rotation R.

The rotary cutting tool 20 includes a replaceable cutting head 22 that has a head longitudinal axis A, around which the replaceable cutting head 22 rotates in the direction of rotation R. The head longitudinal axis A extends in the forward $D_F$ to rearward direction $D_R$. The replaceable cutting head 22 can be typically made from cemented carbide.

The rotary cutting tool 20 also includes a tool holder 24 having a holder longitudinal axis C. The tool holder 24 can be typically made from steel. The replaceable cutting head 22 can be removably retained in the tool holder 24 by means of a threaded coupling mechanism. Such a threaded coupling mechanism could possibly be advantageous for other types of rotary cutting operations than that stated hereinabove, such as, for example, reaming or drilling.

It should be appreciated that use of the terms "forward" and "rearward" throughout the description and claims refer to a relative position of the replaceable cutting head 22 to the tool holder 24 of the assembled rotary cutting tool 20, as seen in FIG. 1. The terms "forward" and "rearward" may also be applied in a direction of the head longitudinal axis A towards the left and right, respectively, in FIGS. 3 and 4, and also in a direction of holder longitudinal axis C towards the left and right, respectively, in FIGS. 5 and 6.

Figure 3:
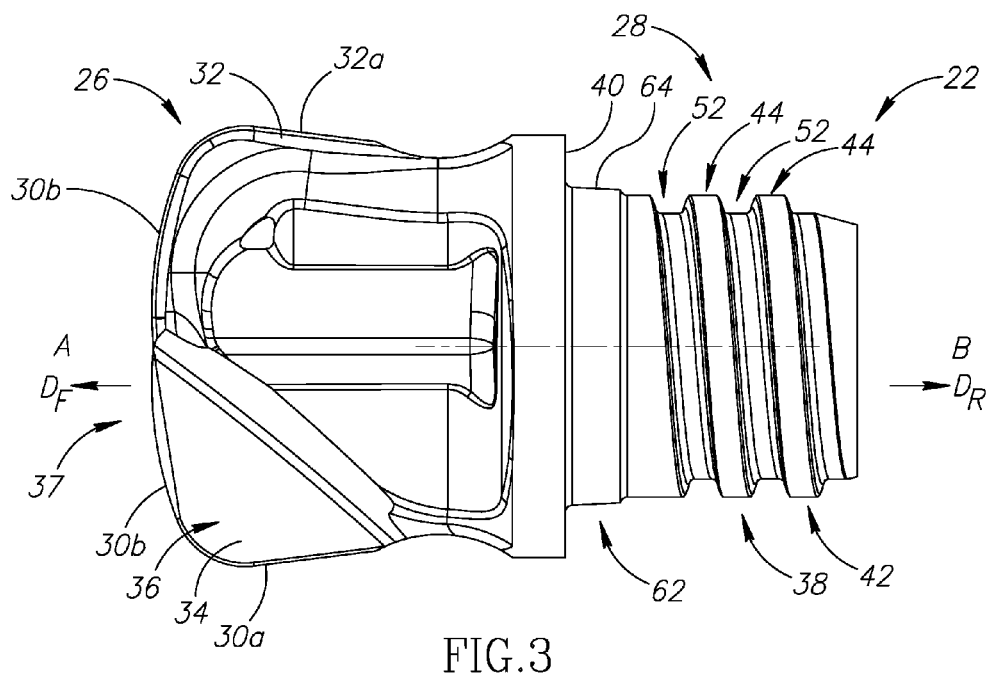
FIG. 3 is a side view of a replaceable cutting head shown in FIGS. 1 and 2.
Figure 4:
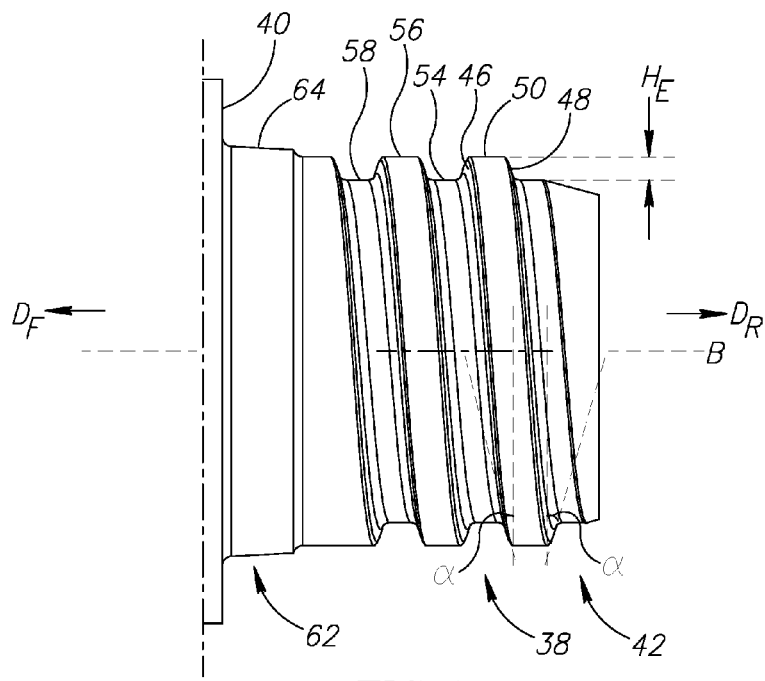
FIG. 4 is a detail of FIG. 3.

Reference is now made to FIGS. 3 and 4. The replaceable cutting head 22 has a forward portion that forms a cutting portion 26 and a rearward portion that forms a mounting portion 28. In accordance with some embodiments of the subject matter of the present application the replaceable cutting head 22 can be formed from a unitary integral one-piece construction. This provides an advantage in that the replaceable cutting head 22 has no detachable cutting inserts (not shown).

Referring to FIG. 3, the cutting portion 26 includes at least one peripheral cutting edge 30. In this non-limiting example shown in the drawings there can be exactly two peripheral cutting edges. Each peripheral cutting edge 30 is formed at the intersection of a peripheral relief surface 32, and a peripheral rake surface 34. The peripheral relief surface 32 is located rotationally behind the peripheral cutting edge 30 and the peripheral rake surface 34 is located rotationally ahead of the peripheral cutting edge 30, both in respect to the direction of rotation R. The orientation of the peripheral cutting edge 30 allows metal cutting operations to be performed.

In accordance with some embodiments of the subject matter of the present application the cutting portion 26 can include at least one flute 36 for evacuating chips (not shown) that are produced during the cutting operation. One flute 36 is associated to each peripheral cutting edge 30. The replaceable cutting head 22 can include one or more end cutting edges 30b at an end face 37 of the cutting portion 26. In this non-limiting example shown in the drawings, the replaceable cutting head 22 can include exactly two end cutting edges 30b. Each of the two end cutting edges 30b may have an associated side cutting edge 30a.

Making reference now to FIGS. 3 and 4, the mounting portion 28 includes a male coupling member 38 that protrudes rearwardly from a head base surface 40. The head base surface 40 extends transversely with respect to the head longitudinal axis A and defines a boundary between the cutting portion 26 and the mounting portion 28. That is to say, the cutting portion 26 is formed forward of the head base surface 40 and the mounting portion 28 is formed rearward of the head base surface 40. In accordance with some embodiments of the subject matter of the present application the male coupling member 38 can be rigid. The head base surface 40 can be perpendicular to the head longitudinal axis A. The head base surface 40 is intended to abut a corresponding surface on the tool holder 24 when the rotary cutting tool 20 is in a locked position, as will be described hereinafter.

The male coupling member 38 includes an external thread 42. Referring to FIG. 4, the external thread 42 includes an external thread ridge 44 that extends helically about an external thread axis B. The external thread axis B is coincident with the head longitudinal axis A. Thus, the external thread portion 42 and the replaceable cutting head 22 are co-axial. The external thread ridge 44 includes forward and rearward external flank surfaces 46, 48 and an external top surface 50 that extends therebetween. The forward and rearward external flank surfaces 46, 48 face in opposite axial directions $D_F$, $D_R$, with the forward external flank surface 46 facing in the forward direction $D_F$ and the rearward external flank surface 48 facing in the rearward direction $D_R$. The forward and rearward external flank surfaces 46, 48 delimit an external thread groove 52. The external thread groove 52 extends helically about the external thread axis B and includes an external bottom surface 54.

In a cross-sectional view taken in an axial plane (that is, a plane that contains the external thread axis B) the external top surface 50 forms a plurality of external thread crests 56 and the external bottom surface 54 forms a plurality of external thread roots 58. In accordance with some embodiments of the subject matter of the present application, the plurality of external thread crests 56 can be parallel to the external thread axis B and co-linear with each other. The plurality of external thread roots 58 can be parallel to the external thread axis B and co-linear with each other.

In a cross-sectional view taken in an axial plane containing the external thread axis B, the forward and rearward external flank surfaces 46, 48 can be inclined at an external flank angle α with respect to a radial plane perpendicular to the external thread axis B. Preferably, the external flank angle α can be around 17°. The external thread 42 defines an external thread form 60 that can be trapezoidal. The external top surface 50 and external bottom surface 54 can smoothly transition into the forward and rearward external flank surfaces 46, 48, respectively, defining a radius. Alternatively, the external thread form 60 can be triangular.

The external top surface 50 and external bottom surface 54 can form an edge. The plurality of external thread crests 56 define the major diameter and the plurality of external thread roots 58 define the minor diameter of the external thread 42, respectively. The major diameter minus the minor diameter, divided by two, equals the external thread height $H_E$ of the external thread 42. The external thread height $H_E$ can be constant. In accordance with some embodiments of the subject matter of the present application, the external thread 42 can have approximately three turns.

The external thread 42 is a straight thread. It should be appreciated that the term "straight thread" throughout the description and claims relates to a thread where the thread ridge extends about a cylinder and thus the thread crests are equidistant from the thread axis. Similarly, it should be appreciated that the term "tapered thread" throughout the description and claims relates to a thread where the thread ridge extends about a cone, whose surface tapers radially inwardly towards the thread axis in the rearward direction, and thus the thread crests decrease in distance from the thread axis in the rearward direction.

As shown in FIGS. 3 and 4, the male coupling member 38 includes a forward bearing portion 62. The forward bearing portion 50 is located on the forward side of the external thread 42. The forward bearing portion 62 includes a forward head abutment surface 64 that tapers radially inwardly towards the head longitudinal axis A in a rearward direction $D_R$. That is to say, the forward head abutment surface 64 has a conical shape facing radially outwards. It is noted that the forward head abutment surface 64 is intended to abut a corresponding surface on the tool holder 24 when the rotary cutting tool 20 is in a locked position, as will be described hereinafter.

Figure 6:
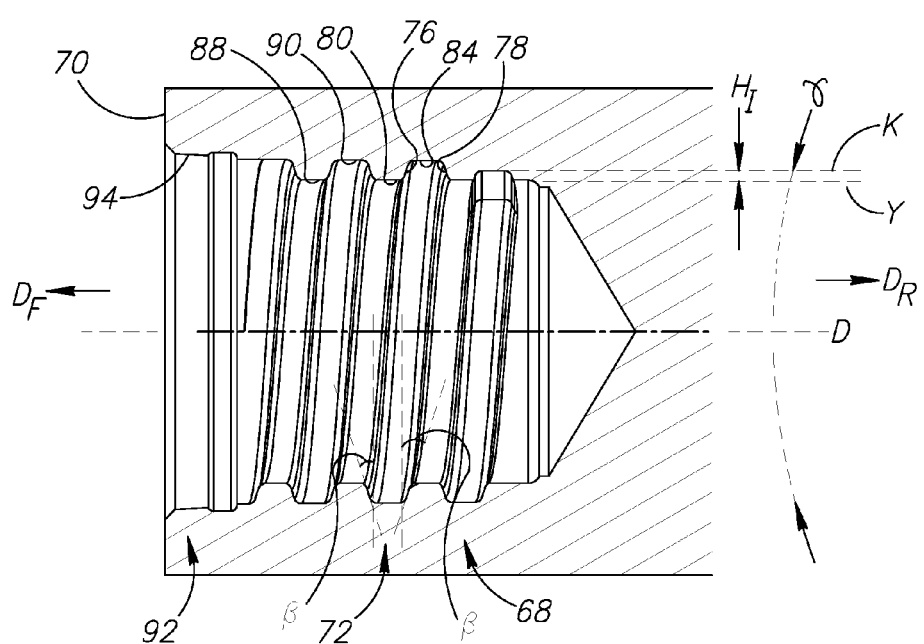
FIG. 6 is a longitudinal cross-sectional view of a female coupling member shown in FIG. 5.

It should be appreciated that use of the terms "radially inward/inwardly" and "radially outward/outwardly" throughout the description and claims refer to a relative position in a perpendicular direction in relation to the head longitudinal axis A and/or holder longitudinal axis C, towards and away from the respective axis, in FIGS. 3 to 4 and FIG. 6.

Figure 5:
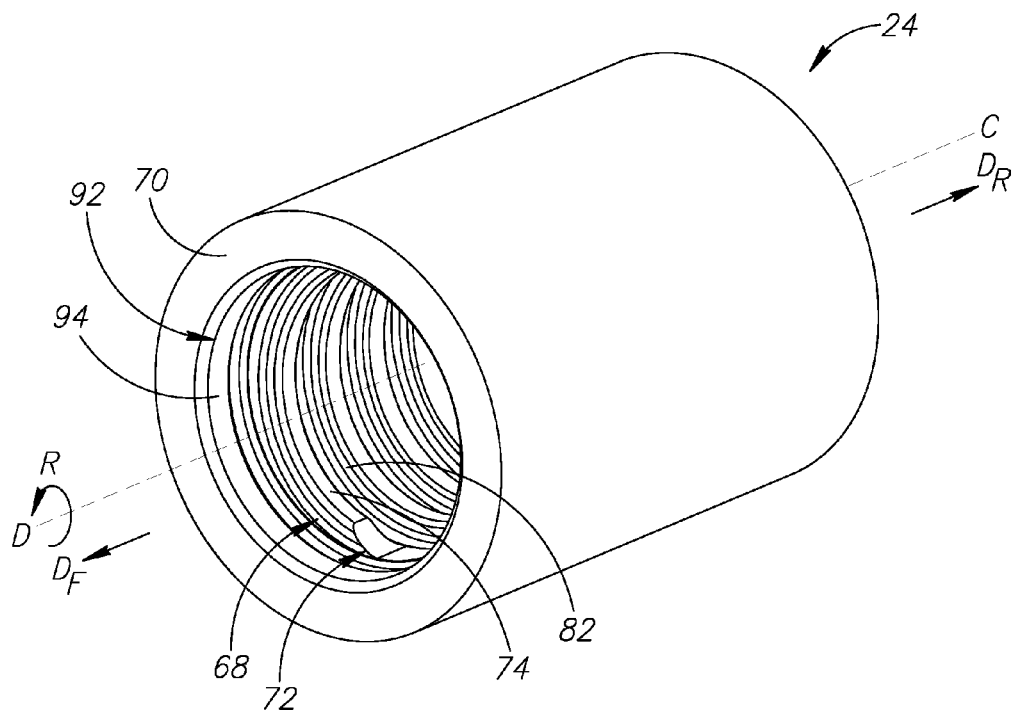
FIG. 5 is a perspective view of a tool holder shown in FIGS. 1 and 2.

Referring now to FIGS. 5 and 6, the tool holder 24 has a holder longitudinal axis C that extends in the forward $D_F$ to rearward direction $D_R$. The tool holder 24 includes a female coupling member 68 that extends rearwardly from a holder forward surface 70. The holder forward surface 70 extends transversely with respect to the holder longitudinal axis C. In accordance with some embodiments of the subject matter of the present application the holder forward surface 70 can be perpendicular to the holder longitudinal axis C.

The female coupling member 68 includes an internal thread 72. As shown in a longitudinal cross-sectional view of the female coupling member 68 containing the internal thread axis D (i.e. FIG. 6), the internal thread 72 includes an internal thread ridge 74 that extends helically about an internal thread axis D. The internal thread axis D is co-incident with the holder longitudinal axis C. Thus, the internal thread portion 72 is co-axial with the tool holder 24. The internal thread ridge 74 includes forward and rearward internal flank surfaces 76, 78 and an internal top surface 80 that extends therebetween. The forward and rearward internal flank surfaces 76, 78 face in opposite axial directions $D_F$, $D_R$, with the forward internal flank surface 76 facing in the forward direction $D_F$ and the rearward internal flank surface 78 facing in the rearward direction $D_R$. The forward and rearward internal flank surfaces 76, 78 delimit an internal thread groove 82.

The internal thread groove 82 extends helically about the internal thread axis D and includes an internal bottom surface 84. In a cross-sectional view taken in an axial plane (that is, a plane that contains the internal thread axis D) the internal top surface 80 forms a plurality of internal thread crests 88 and the internal bottom surface 84 forms a plurality of internal thread roots 90. In accordance with some embodiments of the subject matter of the present application, the plurality of internal thread crests 88 can be parallel to the internal thread axis D and co-linear with each other. The plurality of internal thread roots 90 can be parallel to the internal thread axis D and follow a pattern of decreasing distance therefrom in the rearward direction $D_R$.

Figure 8:
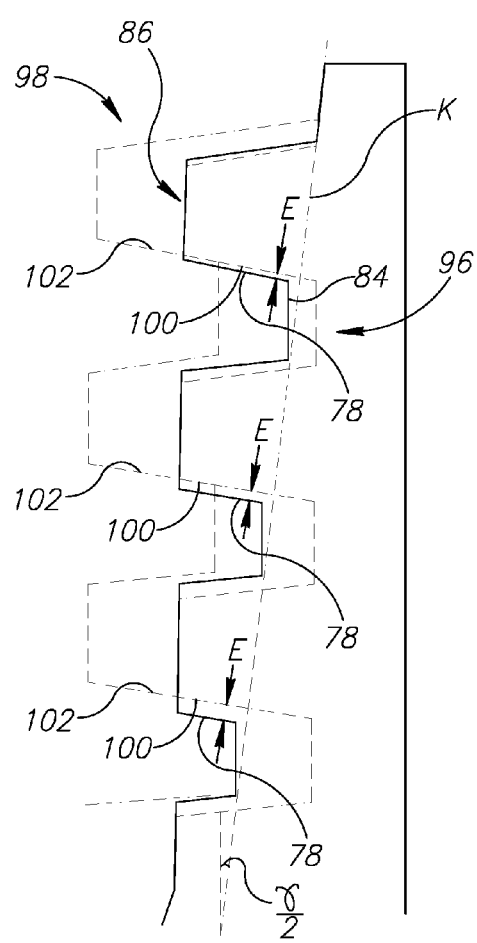
FIG. 8 is a schematic view of the internal thread form of a conical internal thread with the internal thread form of a straight internal thread and external thread form of a straight external thread superimposed thereupon.

In a cross-sectional view taken in an axial plane containing the internal thread axis (D), the forward and rearward internal flank surfaces 76, 78 can be inclined at an internal flank angle $\beta$ with respect to a radial plane perpendicular to the internal thread axis D. Preferably, the internal flank angle $\beta$ can be around 17°. The internal thread 72 defines an internal thread form 86 that can be trapezoidal. Referring now to FIG. 8, the sides of the trapezium may not be equal in length. The internal top surface 80 and internal bottom surface 84 can smoothly transition into the forward and rearward internal flank surfaces 76, 78, respectively, defining a radius. Alternatively, the internal thread form 86 can be triangular.

The internal top surface 80 and internal bottom surface 84 can form an edge. The plurality of internal thread crests 88 define the minor diameter and the plurality of internal thread roots 90 define the major diameter of the internal thread 72, respectively. The major diameter minus the minor diameter, divided by two, equals the internal thread height $H_I$ of the internal thread 72. The internal thread height $H_I$ can be constant, or increasing or decreasing in the rearward direction $D_R$ depending on which of the internal thread ridge 74 and internal thread groove 82 extend about a respective cone K. In this non-limiting example shown in the drawings, the internal thread height $H_I$ decreases in the rearward direction In accordance with some embodiments of the subject matter of the present application, the internal thread 72 can have approximately three turns.

The internal thread 72 is a conical thread. It should be appreciated that the term "conical thread" throughout the description and claims relates to a thread where at least one of the thread ridge and the thread groove extend about a respective cone, whose surface tapers radially inwardly towards the thread axis in the rearward direction, and thus at least one of the thread crests and thread roots decrease in distance from the thread axis in the rearward direction. Such a conical thread may be formed by threading the hollow forward end of a cylindrical steel rod with an internal turning insert. As the steel rod rotates and moves in the axial direction to form the internal thread it also moves radially away from the 'static' cutting insert so that the thread has a conical configuration. The cone and the thread are co-axial. In this non-limiting example shown in FIG. 8, the cone is defined by the points where the internal bottom surface 84 transitions into the rearward internal flank surface 78.

In accordance with some embodiments of the subject matter of the present application, at least one of the internal thread ridge 74 and the internal thread groove 82 can extend about a respective cone K having a cone angle $\gamma$. The cone angle $\gamma$ can be in the range of $0.02° \leq \gamma \leq 1.6°$. Advantageously, the cone angle $\gamma$ can be equal to exactly 0.8°. Only the internal thread groove 82 can extend about a respective cone K. Moreover, the internal thread ridge 74 can extend about a cylinder Y. It should further be appreciated that use of the term "cone angle" throughout the description refers to an angle formed by the tapered surfaces of a cone, in a longitudinal cross-section. It is noted that the term "longitudinal cross-section" refers to a cross-section taken in a plane containing the longitudinal axis. Such a longitudinal cross-section results in an axial plane containing the longitudinal axis.

As shown in FIGS. 5 and 6, the female coupling member 68 includes a forward supporting portion 92 The forward supporting portion 80 is located on the forward side of the internal thread 72. The forward supporting portion 92 includes a forward holder abutment surface 94 that tapers radially inwardly towards the holder longitudinal axis C in a rearward direction $D_R$. That is to say, the forward holder abutment surface 94 has a conical shape facing radially inwards.

Assembly of the rotary cutting tool 20 is known, for example, from U.S. Pat. No. 6,485,220 B2, which is hereby incorporated by reference in its entirety. it is noted that the rotary cutting tool 20 is adjustable between a released position and a locked (or assembled) position.

In the released position the male coupling member 38 is located outside of the female coupling member 68.

Figure 7:
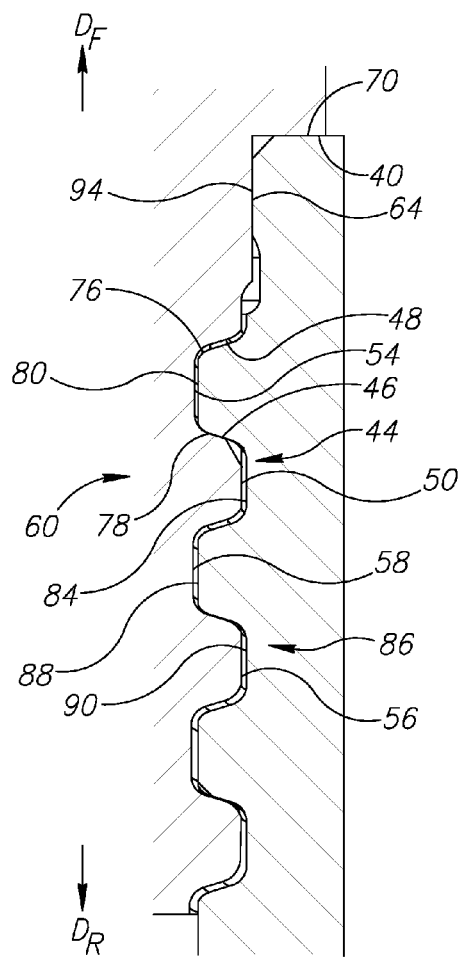
FIG. 7 is a detail of the longitudinal cross-sectional view of the rotary cutting tool shown in FIG. 1, when the rotary cutting tool is in a locked position.

In the locked position the male coupling member 38 is removably retained in the female coupling member 68. Also, the external and internal threads 42, 72 threadingly engage each other. Referring now to FIG. 7, the forward head abutment surface 64 abuts the forward holder abutment surface 94. In accordance with some embodiments of the subject matter of the present application, the rearwardly facing head base surface 40 can abut the forwardly facing holder forward surface 70. The rearward internal flank surface 78 can abut the forward external flank surface 46. The forward internal flank surface 76 can be spaced apart from the rearward external flank surface 48. The internal top surface 80 can be spaced apart from the external bottom surface 54. The internal bottom surface 84 can be spaced apart from the external top surface 50.

Attention is now drawn to FIG. 8 showing a schematic view of the internal thread form 86 of a conical internal thread 72. By means of dashed lines an imaginary internal thread form 96 of a straight internal thread and an imaginary external thread form 98 of a straight external thread, which are threadingly engaged with each other, are superimposed thereupon. it noted that the cone angle γ of the internal thread 72 that forms the internal thread form 86 is exaggerated in order to clearly show the internal thread forms 86, 96 in relation to each other, and thus distances do not represent of true values.

Each turn of the internal thread form 86 is offset from the thread axis D by a distance that, by virtue of the internal. thread 72 being conical, decreases as the internal thread 72 extends helically about the thread axis in the rearward direction $D_R$. Thus, each ridge portion of the internal thread form 86 extends beyond (or stated differently, has a part that "overhangs") a corresponding ridge portion of the imaginary internal thread form 96 such that each rearward internal flank surface 78 is distanced from the respective imaginary rearward internal flank surface 100 by a flank distance E. Moreover, the flank distance E increases in magnitude in the rearward direction $D_R$. That is to say, the flank distance E increases in magnitude for successive thread turns in the rearward direction $D_R$. Similarly, each ridge portion of the internal thread form 86 extends over as to partly cover (i.e. overlaps) a corresponding ridge portion of the imaginary external thread form 98 such that each rearward internal flank surface 78 is distanced from the respective imaginary forward external flank surface 102 by the same flank distance E. Thus clearly, when assembled (i.e., threadingly engaged), the frictional engagement between the external thread 42 and the internal thread 72 increases in a direction from the forwardmost turn of the external thread 42 towards the rearmost turn.

Figure 9:
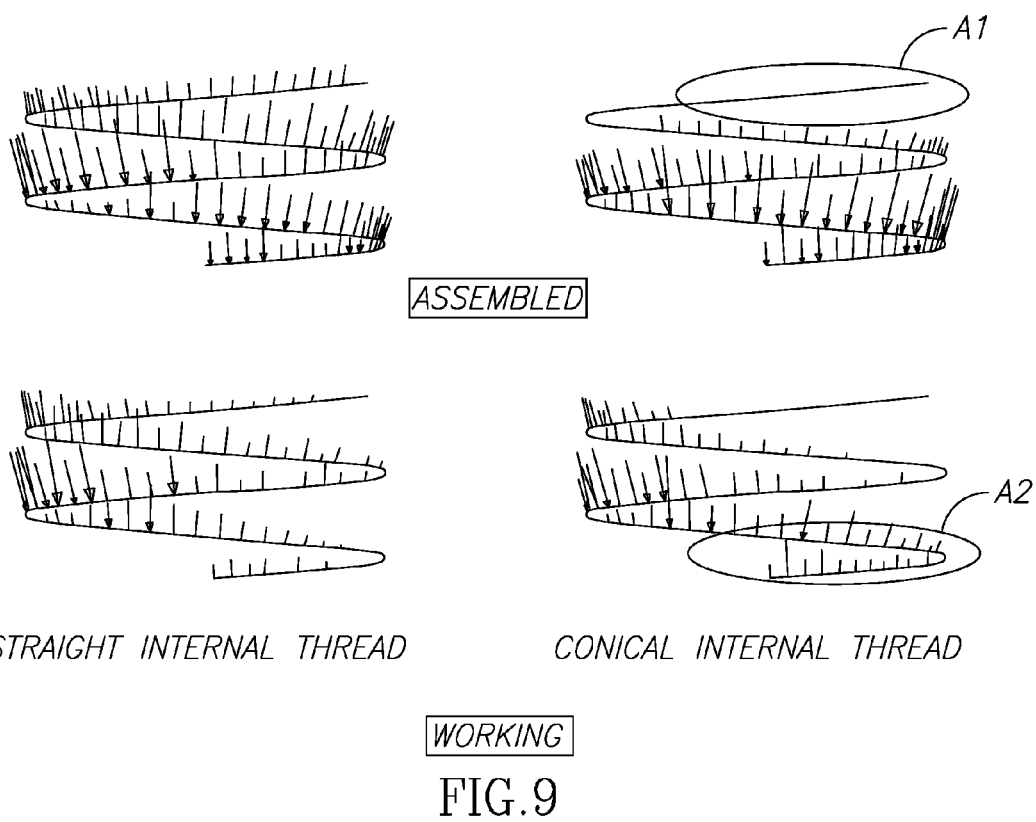
FIG. 9 is four diagrams showing the contact force distribution on straight external threads threadingly engaged with straight and conical internal threads, respectively, when the rotary cutting tool is assembled and working.

Reference is now made to FIG. 9, showing four diagrams showing the contact force distribution exerted on straight external threads that are threadingly engaged with straight and conical internal threads, respectively, when the rotary cutting tool is assembled and working. The lengths of the arrows represent the magnitude of the contact forces. it can be seen that the distribution of the contact forces, when the rotary cutting tools 20 are assembled and working, on a straight external thread threadingly coupled with a conical internal thread (the two diagrams on the right), are located further in the rearward direction $D_R$ compared with a straight internal thread threadingly engaged with a straight internal thread (the two diagrams on the left). In particular, it can be seen that when the rotary cutting tool 20 having the conical internal thread is assembled there are hardly any contact forces located at a forward area. A1 of the straight external thread. Moreover, when said rotary cutting tool 20 is working there are contact forces at a rear area A2 of the straight external thread. By virtue of the foregoing threaded engagement the rotary cutting tool 20 has improved stability against lateral cutting forces.

Although the subject matter of the present application has been described to a certain degree of particularity, it should be understood that various alterations and modifications could be made without departing from the spirit or scope of the invention as hereinafter claimed.

What is claimed is:

1. A rotary cutting tool (20) having a longitudinal axis (L) and extending in a forward ($D_F$) to rearward direction ($D_R$), comprising:
    a tool holder (24), having a holder longitudinal axis (C) and comprising a female coupling member (68) having an internal thread (72) extending rearwardly from a holder forward surface (70), the holder forward surface (70) extending transversely with respect to the holder longitudinal axis (C); and
    a replaceable cutting head (22) having a head longitudinal axis (A) and comprising:
        a forward portion forming a cutting portion (26); and
        a rearward portion forming a mounting portion (28), the mounting portion (28) comprising a male coupling member (38) having an external thread (42) and protruding rearwardly from a head base surface (40), the head base surface (40) extending transversely with respect to the head longitudinal axis (A), and defining a boundary between the cutting portion (26) and the mounting portion (28);
    wherein:
        the external thread (42) of the male coupling member (38) is a straight thread whose thread ridge extends about a cylinder;
        the internal thread (72) of the female coupling member (68) is conical thread; and
        the rotary cutting tool (20) is adjustable between:
            a released position in which the male coupling member (38) is located outside of the female coupling member (68), and the internal and external threads (42, 72) are not threadingly engaged to one another, and
            a locked position in which the male coupling member (38) is removably retained in the female coupling member (68) with the internal and external threads (42, 72) threadingly engaged to one another.

2. The rotary cutting tool (20) according to claim 1, wherein
    the internal thread (72) comprises an internal thread ridge (74), extending helically about an internal thread axis (D), and comprising forward and rearward internal flank surfaces (76, 78) and an internal top surface (80) extending therebetween;
    the forward and rearward internal flank surfaces (76, 78) face in opposite axial directions ($D_F$, $D_R$) and delimit a helical internal thread groove (82) that comprises an internal bottom surface (84); and
    in the released position:
        at least one of the internal thread ridge (74) and the internal thread groove (82) extend about a respective cone (K) having a cone angle (γ); and
        the cone angle (γ) is in the range of $0.02° \leq \gamma \leq 1.6°$.

3. The rotary cutting tool (20) according to claim 2, wherein the cone angle (γ) is equal to exactly 0.8°.

4. The rotary cutting tool (20) according to claim 2, wherein only the internal thread groove (82) extends about a respective cone (K).

5. The rotary cutting tool (20) according to claim 4, wherein the internal thread ridge (74) extends about a cylinder (Y).

6. The rotary cutting tool (20) according to claim 2, wherein in a cross-sectional view taken in an axial plane containing the internal thread axis (D):

the internal top surface (80) forms a plurality of internal thread crests (88) that are parallel to the internal thread axis (D) and co-linear with each other; and the internal bottom surface (84) forms a plurality of internal thread roots (90) that are parallel to the internal thread axis (D) and follow a pattern of decreasing distance therefrom in the rearward direction ($D_R$).

7. The rotary cutting tool (20) according to claim 2, wherein the forward and rearward internal flank surfaces (76, 78) are offset from the internal thread axis (D) by a distance that decreases as the internal ridge (74) extends helically about the internal thread axis (D) in the rearward direction ($D_R$).

8. The rotary cutting tool (20) according to claim 2, wherein:

the external thread (42) comprises an external thread ridge (44), extending helically about an external thread axis (B), and comprising forward and rearward external flank surfaces (46, 48) and an external top surface (50) extending therebetween;

the forward and rearward external flank surfaces (46, 48) face in opposite axial directions ($D_F$, $D_R$) and delimit a helical external thread groove (52) that comprises an external bottom surface (54);

the forward external flank surface (46) and the forward internal flank surface (76) face in the forward direction ($D_F$);

the rearward external flank surface (48) and the rearward internal flank surface (78) face in the rearward direction ($D_R$); and in the locked position, the rearward internal flank surface (78) abuts the forward external flank surface (46).

9. The rotary cutting tool (20) according to claim 8, wherein in the locked position:

the forward internal flank surface (76) is spaced apart from the rearward external flank surface (48);

the internal top surface (80) is spaced apart from the external bottom surface (54); and the internal bottom surface (84) is spaced apart from the external top surface (50).

10. The rotary cutting tool (20) according to claim 8, wherein in a cross-sectional view taken in an axial plane containing the external thread axis (B):

the external top surface (50) forms a plurality of external thread crests (56) that are parallel to the external thread axis (B) and co-linear with each other; and the external bottom surface (54) forms a plurality of external thread roots (58) that are parallel to the external thread axis (B) and co-linear with each other.

11. The rotary cutting tool (20) according to claim 1, wherein in a cross-sectional view taken in an axial plane containing the head longitudinal axis (A), the external thread (42) defines an external thread form (60) that is trapezoidal.

12. The rotary cutting tool (20) according to claim 1, wherein in a cross-sectional view taken in an axial plane containing the holder longitudinal axis (C), the internal thread (72) defines an internal thread form (86) that is trapezoidal.

13. The rotary cutting tool (20) according to claim 1, wherein:

the external thread (42) comprises an external thread ridge (44), extending helically about an external thread axis (B), and comprising forward and rearward external flank surfaces (46, 48) and an external top surface (50) extending therebetween;

the forward and rearward external flank surfaces (46, 48) face in opposite axial directions ($D_F$, $D_R$) and delimit a helical external thread groove (52) that comprises an external bottom surface (54);

the forward external flank surface (46) and the forward internal flank surface (76) face in the forward direction ($D_F$);

the rearward external flank surface (48) and the rearward internal flank surface (78) face in the rearward direction ($D_R$);

in the locked position:

the rearward internal flank surface (78) abuts the forward external flank surface (46);

the forward internal flank surface (76) is spaced apart from the rearward external flank surface (48);

the internal top surface (80) is spaced apart from the external bottom surface (54); and the internal bottom surface (84) is spaced apart from the external top surface (50); and frictional engagement between the external thread (42) and the internal thread (72) increases in a direction from a forwardmost turn of the external thread (42) towards the rearmost turn of the external thread (42).

14. A tool holder (24), having a holder longitudinal axis (C) extending in the forward ($D_F$) to rearward direction ($D_R$), comprising a female coupling member (68) having an internal thread (72) extending rearwardly from a holder forward surface (70), the holder forward surface (70) extending transversely with respect to the holder longitudinal axis (C), wherein:

the internal thread (72) of the female coupling member (68) is a conical thread;

the internal thread (72) comprises an internal thread ridge (74) extending helically about an internal thread axis (D) and also about a cylinder (Y), the internal thread ridge (74) comprising forward and rearward internal flank surfaces (76, 78) and an internal top surface (80) extending therebetween;

the forward and rearward internal flank surfaces (76, 78) face in opposite axial directions ($D_F$, $D_R$) and delimit a helical internal thread groove (82) that comprises an internal bottom surface (84);

at least one of the internal thread ridge (74) and the internal thread groove (82) extend about a respective cone (K) having a cone angle ($\gamma$); and the cone angle ($\gamma$) is in the range of $0.02° \leq \gamma \leq 1.6°$.

15. The tool holder (24) according to claim 14, wherein the cone angle ($\gamma$) is equal to exactly 0.8°.

16. The tool holder (24) according to claim 14, wherein only the internal thread groove (82) extends about a respective cone (K).

17. The tool holder (24) according to claim 14, wherein in a cross-sectional view taken in an axial plane containing the internal thread axis (D):

the internal top surface (80) forms a plurality of internal thread crests (88) that are parallel to the internal thread axis (D) and co-linear with each other; and the internal bottom surface (84) forms a plurality of internal thread roots (90) that are parallel to the internal thread axis (D) and follow a pattern of decreasing distance therefrom in the rearward direction ($D_R$).

18. The tool holder (24) according to claim 14, wherein in a cross-sectional view taken in an axial plane containing the holder longitudinal axis (C), the internal thread (72) defines an internal thread form (86) that is trapezoidal.

19. The tool holder (24) according to claim 14, wherein the forward and rearward internal flank surfaces (76, 78) are offset from the internal thread axis (D) by a distance that decreases as the internal ridge (74) extends helically about the internal thread axis (D) in the rearward direction ($D_R$).

20. A rotary cutting tool (20) having a longitudinal axis (L) and extending in a forward ($D_F$) to rearward direction ($D_R$), comprising:
- a tool holder (24), having a holder longitudinal axis (C) extending in the forward ($D_F$) to rearward direction ($D_R$), comprising a female coupling member (68) having an internal thread (72) extending rearwardly from a holder forward surface (70), the holder forward surface (70) extending transversely with respect to the holder longitudinal axis (C), wherein:
  - the internal thread (72) of the female coupling member (68) is a conical thread;
  - the internal thread (72) comprises an internal thread ridge (74) extending helically about an internal thread axis (D) and comprising forward and rearward internal flank surfaces (76, 78); and an internal top surface (80) extending therebetween;
  - the forward and rearward internal flank surfaces (76, 78) face in opposite axial directions ($D_F, D_R$) and delimit a helical internal thread groove (82) that comprises an internal bottom surface (84);
  - at least one of the internal thread ridge (74) and the internal thread groove (82) extend about a respective cone (K) having a cone angle ($\gamma$); and
  - the cone angle ($\gamma$) is in the range of $0.02° \leq \gamma \leq 1.6°$; and
- a replaceable cutting head (22) having a head longitudinal axis (A) and comprising:
  - a forward portion forming a cutting portion (26); and
  - a rearward portion forming a mounting portion (28), the mounting portion (28) comprising a male coupling member (38) having an external thread (42) and protruding rearwardly from a head base surface (40), the head base surface (40) extending transversely with respect to the head longitudinal axis (A), and defining a boundary between the cutting portion (26) and the mounting portion (28);

wherein:
- the external thread (42) of the male coupling member is a straight thread, whose thread ridge extends about a cylinder; and
- the rotary cutting tool (20) is adjustable between:
  - a released position in which the male coupling member (38) is located outside of the female coupling member (68), and the internal and external threads are not threadingly engaged to one another, and
  - a locked position in which the male coupling member (38) is removably retained in the female coupling member (68) with the internal and external threads threadingly engaged to one another.

* * * * *